United States Patent [19]
Carpenter

[11] 3,941,412
[45] Mar. 2, 1976

[54] HOSE HANDLING APPARATUS

[76] Inventor: Hubert T. Carpenter, 3821 Pacific Heights Blvd., San Bruno, Calif. 94066

[22] Filed: Apr. 29, 1974

[21] Appl. No.: 464,857

[52] U.S. Cl. .................. 294/74; 224/49; 248/60; 248/75
[51] Int. Cl.² .......................................... B66C 1/16
[58] Field of Search ............... 294/74, 67 E, 67 EA; 224/49, 58; 248/60, 75

[56] References Cited
UNITED STATES PATENTS

| | | | |
|---|---|---|---|
| 1,405,052 | 1/1922 | Maher | 294/74 |
| 1,632,952 | 6/1927 | Daughs | 294/74 |
| 2,676,834 | 4/1954 | Grazier | 294/74 |
| 3,165,286 | 1/1965 | Johnson et al. | 248/75 |
| 3,425,737 | 2/1969 | Sutton | 294/74 |

Primary Examiner—Evon C. Blunk
Assistant Examiner—Jeffrey V. Nase
Attorney, Agent, or Firm—Phillips, Moore, Weissenberger Lempio & Strabala

[57] ABSTRACT

A hose handling apparatus includes a body of generally U-shaped cross-section in which a portion of a hose may be seated. Strap means are included, by which the body and hose disposed thereon may be supported, and through such supporting thereby, cinching means are actuated to secure the hose relative to the body. The cinching means and support means are connected to the body so as to allow easy removal and installation of the hose relative to the body, meanwhile ensuring simplicity and ease of operation.

2 Claims, 5 Drawing Figures

U.S. Patent  March 2, 1976  3,941,412
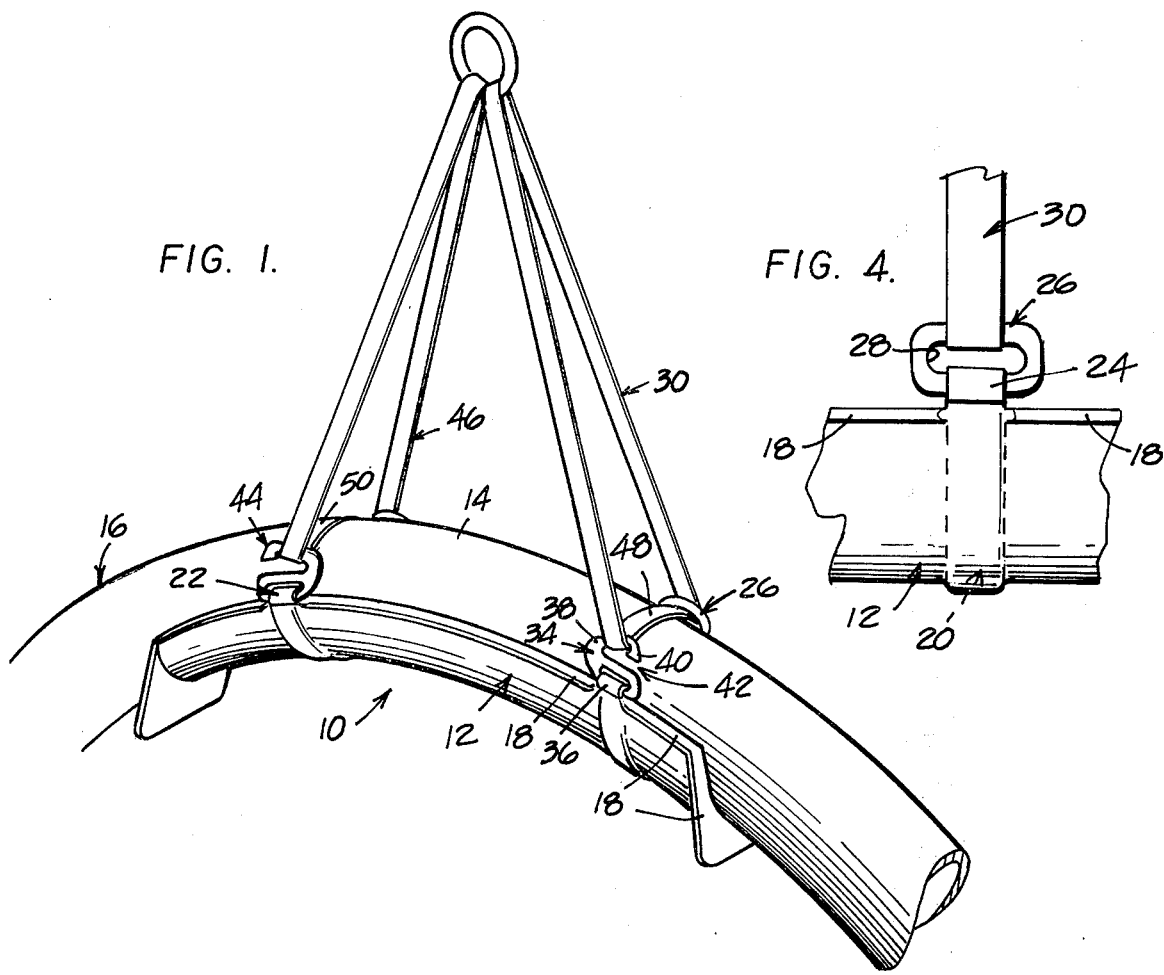
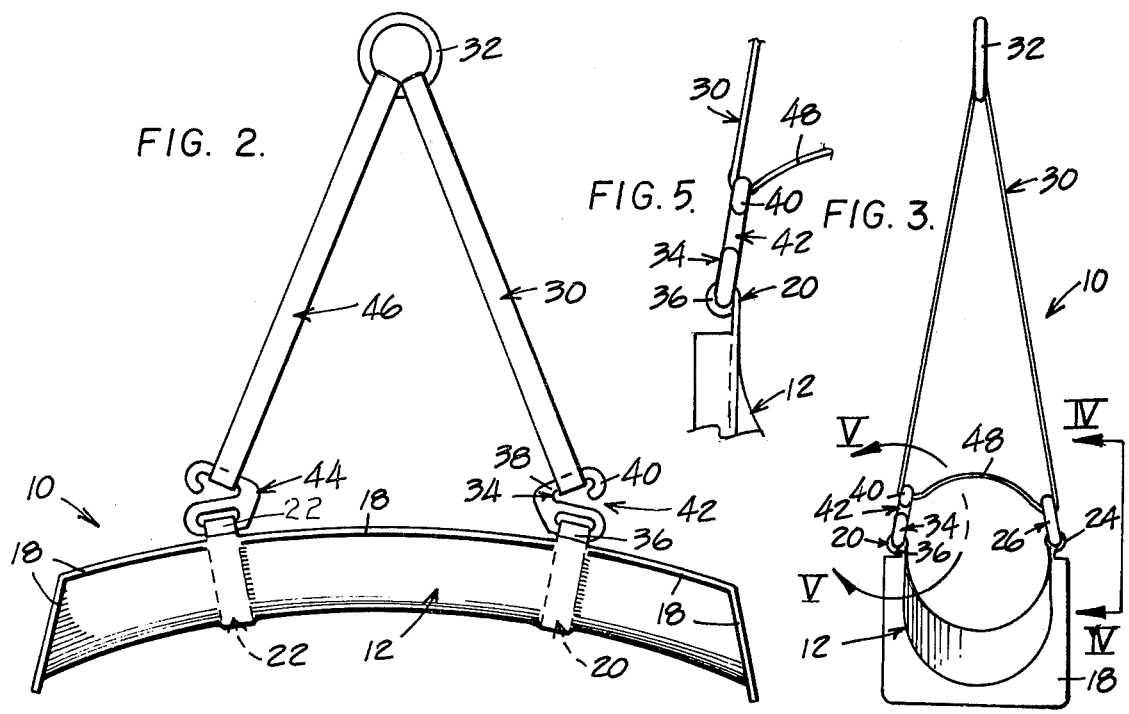

HOSE HANDLING APPARATUS

BACKGROUND OF THE INVENTION

This invention relates to hose handling apparatus, and more particularly, to a hose saddle and hose securing means associated therewith.

In the handling of large, relatively flexible hose, it is of course important that such hose be properly supported by appropriate apparatus where necessary. It will also be understood that, at such point or points of support thereof, no kinking of or damage to the hose may occur. Meanwhile, it is desirable that such an apparatus be extremely convenient for use and simple in design, so as to allow safe, efficient use thereof. Such simplicity and efficiency of design is of particular importance when it is desirable to secure the hose relative to the apparatus, to provide proper stability in the handling thereof.

Of general interest in this area are U.S. Pat. No. 1,462,897 to Barto, U.S. Pat. No. 1,524,444 to Malia, U.S. Pat. No. 2,895,762 to Seving, U.S. Pat. No. 2,912,180 to Lindberg, U.S. Pat. No. 3,425,737 to Sutton, and Austrian Pat. No. 247,556.

SUMMARY OF THE INVENTION

It is accordingly an object of this invention to provide hose handling apparatus which is capable of supporting a portion of a flexible hose without kinking or damage thereto.

It is a further object of this invention to provide hose handling apparatus which, while fulfilling the above object, provides extremely convenient cinching means for securing a hose portion relative to the body of the apparatus, meanwhile allowing extremely efficient and convenient use thereof.

Broadly stated, the invention comprises a hose handling apparatus comprising a body, and means connected to the body and by which the body may be supported. Force applying means are associated with the body, so that upon the supporting of the body by the means connected to the body, securing force is applied to a hose positioned on the body, tending to secure such a positioned hose relative to the body.

BRIEF DESCRIPTION OF THE DRAWINGS

These and other objects of the invention will become apparent from a study of the following specification and drawings, in which:

FIG. 1 is an overall perspective view of the apparatus, shown in combination with a portion of a hose;

FIG. 2 is a side elevation of the apparatus shown in FIG. 1;

FIG. 3 is an end elevation of the apparatus as shown in FIG. 2;

FIG. 4 is a view taken along the line 4—4 of FIG. 3;

FIG. 5 is an enlarged view of the area 5—5 of FIG. 3.

DESCRIPTION OF THE PREFERRED EMBODIMENT

Shown in the drawings is the preferred embodiment of hose handling apparatus 10. The apparatus 10 includes a body 12 which is of generally U-shaped cross-section, and which is curved in a downward arc on either side of its mid-point, along its longitudinal axis, so as to properly seat a portion 14 of a hose 16 therein without kinking or damage thereto. The body 12 includes reinforcing ribs 18 about the edges thereof for added rigidity and strength. The body 12 may with advantage be of molded reinforced fiberglass material, and includes flat steel members 20,22 embedded in the fiberglass material.

The steel member 20 defines a loop 24 on one side of the body 12, and a connecting member 26 defines an aperture 28 through which is secured the loop 24 so that the connecting member 26 is non-removable therefrom, the connecting member 26 being on one side of the body. Disposed through the aperture 28 in the connecting member 26 is a flexible strap member 30 which is unbroken along its length so as to define a continuous loop.

The strap member 30 also is disposed through a ring 32. The strap member 30, it will be seen, is slidable through the ring 32 and aperture 28 of the connecting member 26, and is non-removable from the connecting member 26, which is actually an enclosed member as shown.

A connecting member 34 is disposed through a loop 36 defined by the other end of the steel member 20, so as to be non-removable therefrom. Such connecting member 34 is disposed on the other side of the body 12. The connecting member 34 defines an upper leg 38 ending in a down-turned end portion 40, and an opening 42 for allowing installation of the strap member 30 therein, or selective removal of the strap member 30 therefrom. The strap member 30, when disposed under the leg 38, is in a sliding relation with the connecting member 34.

The steel member 22 has associated therewith connecting members (one shown at 44), similar to connecting members 26,34, on either side of the body 12, and a flexible strap member 46 is associated with these connecting members and disposed through ring 32.

In the use of the apparatus 10, the strap members 30,46 are removed from the connecting members 34,44 through the openings provided, the entire apparatus remaining together as an assembly because of the construction described above. The body 12 may be disposed under a portion 14 of hose 16 and the hose portion 14 seated on the body 12. The strap members 30,46 are positioned under the legs (as at 38) of the connecting members 34,44 so that portions 48,50 of the strap members 30,46 extend generally across the body 12 and between the connecting members associated therewith, over the hose portion 14. That is, the hose portion 14 is positioned between the body 12 and the strap member portions 48,50. Upon lifting of the ring 32, the strap members 30,46 are allowed to slide to an extent relative to the connecting members, and act as means by which the body 12 and hose portion 14 may be supported. Upon such lifting, the strap portions 48,50 act as force applying means, applying a cinching or securing force to the hose portion 14 positioned on the body 12, tending to secure the hose portion 14 relative to the body 12.

Upon completion of the hose supporting operation, the hose portion 14 may be lowered, and the strap members 30,46 removed from the connecting members 34,44 through the openings provided, and the body 12 and structure connected thereto may be easily and conveniently moved away from the hose 16.

The strap members 30,46 are angled outwardly of the ring 32 in the direction of the body 12 to provide a stable carrying of the hose 16, as shown in FIG. 1.

It will be seen that the overall apparatus 10 is extremely convenient and simple in use, in that it is maintained as a unit assembly, ready for use when appropriate. In such use, the apparatus 10 may be easily positioned, and connected up by the means described above, and it will be seen that upon lifting of the hose portion by the apparatus 10, an automatic hose portion cinching effect is provided, securing such hose portion relative to the body 12 of the apparatus 10.

What is claimed is:

1. A hose handling apparatus comprising:
   a substantially rigid hose saddle curved along its longitudinal axis and having a generally U-shaped cross-section adapted to receive a large diameter flexible hose;
   a pair of closed hook connecting means fixedly connected at spaced-apart locations along one top edge of said hose saddle;
   a pair of open hook connecting means fixedly connected at spaced-apart locations along the opposite top edge of said hose saddle so each is directly opposite a closed hook connecting means; and
   sling lifting means having two loops, one of said loops passing through one of said closed hook connecting means and the other of said loops passing through said other closed hook connecting means, whereby a portion of each loop may be extended transversely across the hose saddle and detachably connected in the open hook connecting means whereby a choking force will be applied to a hose in the saddle as the latter is lifted through said two loops so connected in said open and closed hook connecting means, and said saddle can be quickly detached from said hose by merely disconnecting said loops from said open hook connecting means without complete release of said saddle from said loops.

2. The hose handling apparatus as defined in claim 1, wherein said hook connecting means are hinged to better apply choking force to the hose within the hose saddle.

* * * * *